(12) United States Patent
Weidlich et al.

(10) Patent No.: US 10,852,248 B2
(45) Date of Patent: Dec. 1, 2020

(54) APPARATUS AND METHOD FOR ANALYZING PARTICLES

(71) Applicant: Heraeus Quarzglas GmbH & Co. KG, Hanau (DE)

(72) Inventors: Stefan Weidlich, Wiesbaden (DE); Markus Schmidt, Jena (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 0 days.

(21) Appl. No.: 16/523,226

(22) Filed: Jul. 26, 2019

(65) Prior Publication Data

US 2020/0033272 A1 Jan. 30, 2020

(30) Foreign Application Priority Data

Jul. 27, 2018 (EP) .................................... 18186099

(51) Int. Cl.
*G01N 21/956* (2006.01)
*G01N 15/14* (2006.01)
*G01N 21/53* (2006.01)

(52) U.S. Cl.
CPC ....... *G01N 21/95623* (2013.01); *G01N 15/14* (2013.01); *G01N 21/53* (2013.01); *G01N 2201/08* (2013.01)

(58) Field of Classification Search
CPC ............... G01N 15/14; G01N 15/1436; G01N 15/0205; G01N 15/147; G01N 15/0227;
(Continued)

(56) References Cited

U.S. PATENT DOCUMENTS

| | | | | |
|---|---|---|---|---|
| 5,163,332 A | * | 11/1992 | Wong | G01N 21/255 73/863.23 |
| 5,222,389 A | * | 6/1993 | Wong | G01N 1/2258 250/338.5 |

(Continued)

FOREIGN PATENT DOCUMENTS

| | | |
|---|---|---|
| DE | 10 2013 210 259 | 9/2013 |
| JP | 2006125901 | 5/2006 |

(Continued)

*Primary Examiner* — Sang H Nguyen
(74) *Attorney, Agent, or Firm* — Dicke, Billig & Czaja, PLLC

(57) ABSTRACT

One aspect is an apparatus for analyzing particles a capillary as a measuring cell with a hollow channel for receiving or passing through a test sample containing the particles includes a light source for generating a light beam, an optical device for coupling the light beam into the hollow channel at an input point for the purpose of illuminating the test sample, and a detector for detecting scattered light exiting the hollow channel. In one aspects, the hollow channel has an internal diameter $D_H$ in the range of 10 μm to 60 μm, that the light beam has a radial light intensity distribution with a minimum beam diameter $D_L$, wherein the following applies to the diameter ratio $D_L/D_H$: $0.05 < D_L/D_H < 2.00$, and that the light beam has an angle of incidence of less than 2 degrees in relation to the hollow channel's longitudinal axis on entering the hollow channel.

18 Claims, 4 Drawing Sheets

(58) Field of Classification Search
CPC ............. G01N 21/53; G01N 21/95623; G01N 2015/0053; G01N 2015/1452; G01N 2015/1497; G01N 2015/1493; G01N 2015/0294; G01N 2201/08
See application file for complete search history.

(56) References Cited

U.S. PATENT DOCUMENTS

| | | | | |
|---|---|---|---|---|
| 5,312,535 | A * | 5/1994 | Waska | G01N 27/44721 |
| | | | | 204/603 |
| 7,110,108 | B2 * | 9/2006 | Puppels | G01N 21/65 |
| | | | | 356/301 |
| 9,329,082 | B2 | 5/2016 | Welz | |
| 2004/0004717 | A1 * | 1/2004 | Reed | G01N 15/14 |
| | | | | 356/338 |
| 2005/0221503 | A1 * | 10/2005 | Drachev | G01N 21/658 |
| | | | | 436/518 |
| 2008/0268469 | A1 * | 10/2008 | Srienc | G01N 21/4788 |
| | | | | 435/7.2 |
| 2010/0002993 | A1 * | 1/2010 | Hasman | G02B 6/4204 |
| | | | | 385/31 |
| 2014/0296089 | A1 | 10/2014 | Holmes et al. | |
| 2017/0254739 | A1 * | 9/2017 | Faez | G01N 21/53 |
| 2017/0261423 | A1 * | 9/2017 | Weidlich | G01N 21/33 |

FOREIGN PATENT DOCUMENTS

| | | |
|---|---|---|
| WO | 2016/038015 | 3/2016 |
| WO | 2016/038108 | 3/2016 |

* cited by examiner

APPARATUS AND METHOD FOR ANALYZING PARTICLES

CROSS-REFERENCE TO RELATED APPLICATION

This Utility Patent Application claims priority to European Application No. 18 186 099.0 filed on Jul. 27, 2018, which is incorporated herein by reference.

TECHNICAL FIELD

Characterizing a sample in a fluid medium in basic medical and biological research and as a routine diagnostic method.

BACKGROUND

Methods of characterizing a sample in a fluid medium are standard practice in basic medical and biological research and as a routine diagnostic method in numerous medical fields in hospitals.

One common method is flow cytometry, in which the light scattered from particles is analyzed. The complexity of the apparatus required is low and, in principle, it can be employed for cost-effective analysis. A suitable scattered-light measuring assembly is known from DE 10 2013 210 259 A1. The flow-measuring cell here is in the form of a hollow quartz-glass cylinder equipped with a central longitudinal bore. A liquid stream with the particles to be characterized is passed through the bore and illuminated with a laser beam, which is injected via the hollow cylinder's cladding. At various angles around the cylindrical measuring cell, detectors are arranged which absorb the scattered light. The molecules or colloidal substances contained in the liquid are analyzed e.g. with respect to their size, mass or structure.

However, owing to a high background signal with a poor signal-to-noise ratio, low measuring sensitivity is often obtained here. It is therefore frequently necessary to view fluorescent light instead of scattered light in order to obtain a stronger signal, which can be separated from the background. Exceedingly few sample particles display natural fluorescence, however, and it is therefore necessary in these cases to prepare the samples by adding a fluorescent group.

A higher measuring sensitivity is obtained with an analytical apparatus and an analytical method according to the type mentioned above as described in WO 2016/038015 A1. A light-guiding hollow channel is used as the measuring cell here, into the end face of which the illuminating light exciting the light scattering is coupled. The hollow channel lies in the core of an optical waveguide composed of quartz glass with an inhomogeneous refractive index profile in the radial direction, so that the coupled-in illuminating light propagates by total internal reflection along the hollow channel's longitudinal axis in the fiber core and to a certain extent also in the hollow channel itself.

The scattered light exiting through the hollow-channel wall is detected by a detector. This is configured to measure e.g. the coherent scattering intensity of the scattered light, the incoherent scattering intensity of the scattered light, the spectral distribution of the scattered light, the spatial distribution of the scattered light and/or the dynamic motion of the particles to be measured. In addition, the detector can also be configured to detect scattered fluorescent light that is generated by the illumination of the particles to be measured.

The hollow channel, which is limited to an aperture cross-section of less than 0.2 $\mu m^2$, is filled with liquid containing the particles to be investigated. The nature of the interaction between light and material causes the illuminating light to scatter to only a small extent in the quartz glass but significantly more strongly from the particles present in the liquid. The scattered measuring light is captured by a camera and processed for analysis. A small core cross-sectional area and a large difference in refractive index between core and cladding promote the spatial confinement of the illuminating light in the core region of the optical waveguide and improve the illumination of the hollow channel. It is mentioned that the hollow channel can be in the form of a capillary. A similar analytical apparatus and an analytical method are described in WO 2016/038108 A1.

JP 2006-125901 A describes a method and an apparatus for capillary electrophoresis. The apparatus includes a plurality of capillaries comprising an irradiation site, wherein the irradiation sites are arranged in a planar manner. For simultaneously measuring a large number of capillaries, an array of capillaries is arranged in which the laser irradiation positions form a common line. The laser light is divided so that both sides of each array can be irradiated with high efficiency laser light. In an example 384 capillaries are bundled to form a capillary array. Each of the capillaries is made of quartz and coated with fluorocarbon material on the outer surface, and has a total length of 40 cm, an outer diameter of 130 $\mu m$, and an inner diameter of 50 $\mu m$.

US 2014/2960689 A1 describes a biological sample processing device comprising a cytometry station comprising an imaging device and a stage for receiving a microscopy cuvette and a detection station. In another embodiment a capillary electrophoresis process is described in which a buffer-filled capillary is suspended between two reservoirs filled with buffer. An electric field is applied across the two ends of the capillary. Samples containing one or more components or species are typically introduced at the high potential end and under the influence of the electrical field. An array of capillaries may be held in a guide and the intake ends of the capillaries are dipped into vials that contain samples. After the samples are taken in by the capillaries, the ends of the capillaries are removed from the sample vials and submerged in a buffer which can be in a common container or in separate vials. The samples migrate toward the low potential end. During the migration, components of the sample are electrophoretically separated. After separation, the components are detected by a detector. Detection may be effected while the samples are still in the capillaries or after they have exited the capillaries. The internal diameter of the capillaries can range from about 5 to 300 $\mu m$, with about 20 to 100 $\mu m$ in one embodiment. The length of the capillary can generally range from about 100 to 3000 mm. It is typically constructed of nonconductive material so that high voltages can be applied across the capillary without generating excessive heat. Inorganic materials such as quartz, glass and fused silica and the like can be advantageously used to make capillaries. Where excitation and/or detection are effected through the capillary wall, a particularly advantageous capillary is one that is constructed of transparent material.

The measuring rate in such analytical methods is limited by the aperture cross-section of the hollow channel. According to WO 2016/038015 A1, this is restricted to less than 0.2 $\mu m^2$. Compared to such a narrow hollow channel, a capillary with a comparatively large diameter in the range of a few micrometers can allow not only a higher measuring rate but also multiple parallel measurements and the detection of larger particles.

Thus, the use of a capillary as a hollow channel in the analysis of particles, such as e.g. in flow cytometry, would be desirable in principle but throws up a number of other technical problems, such as a sufficiently high signal-to-noise ratio, which have neither been addressed nor solved in the prior art.

One aspect is therefore based on the object of providing an apparatus for analyzing particles, in which a capillary can be used as a measuring cell and which permits a reliable, reproducible measurement with a high signal-to-noise ratio.

Furthermore, one aspect is based on the object of specifying a method for analyzing particles which allows a reliable, reproducible measurement with a high signal-to-noise ratio.

SUMMARY

One aspect relates to an apparatus for analyzing particles, including:
- a glass capillary as a measuring cell with a hollow channel for receiving or for passing through a test sample containing the particles, said hollow channel having a hollow-channel longitudinal axis and a hollow-channel internal wall,
- a light source for generating a light beam and an optical device for coupling the light beam into the hollow channel at an input point for the purpose of illuminating the test sample, and
- a detector for detecting scattered light exiting the hollow channel.

Furthermore, one aspect relates to a method for analyzing particles, comprising the following method steps:
- providing a measuring cell in the form of a glass capillary with a hollow channel having a hollow-channel longitudinal axis and a hollow-channel internal wall,
- introducing a test sample containing the particles into the hollow channel, wherein the test sample has a refractive index $\Delta n_M$
- generating a light beam using a light source,
- coupling the light beam into the hollow channel by means of an optical input device at an input point for the purpose of illuminating the test sample, and
- detecting scattered light exiting the hollow channel using a detector.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

Embodiments are explained in more detail below with reference to exemplary embodiments and a drawing. The individual figures show the following.

DETAILED DESCRIPTION

Figure 1:
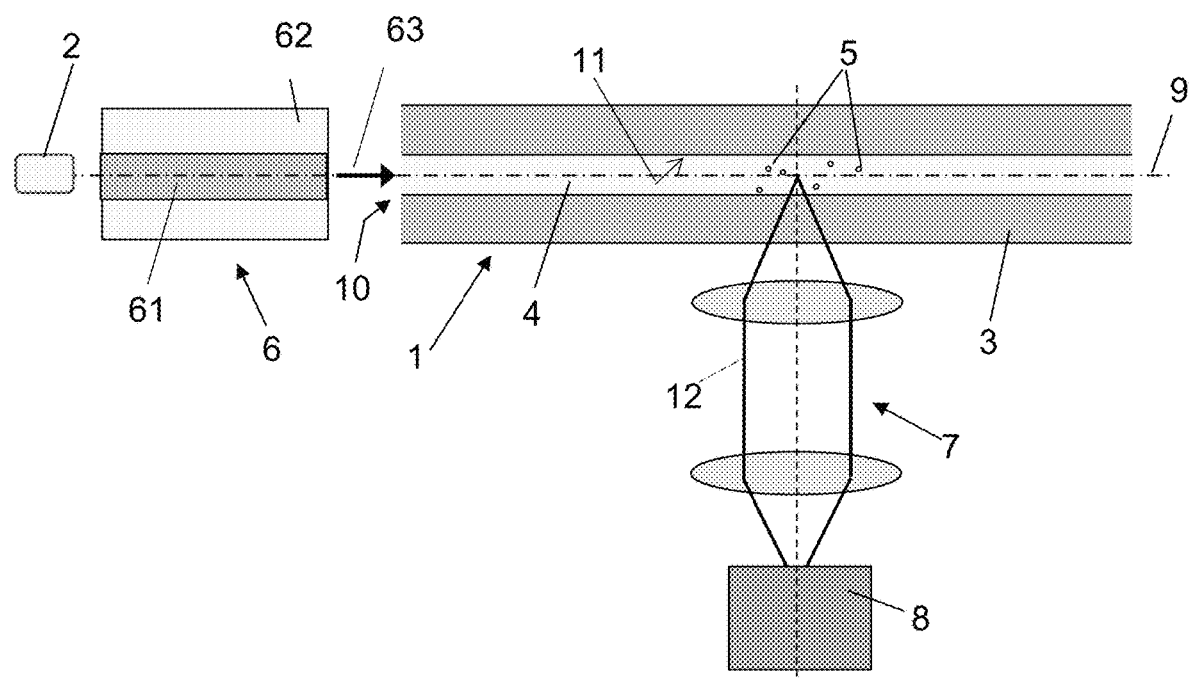
FIG. 1: illustrates a basic measurement setup for flow cytometry using an apparatus according to one embodiment.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

With regard to the apparatus, this object is achieved according to the one embodiment, starting from an apparatus of the type mentioned above, by the facts that
- the hollow channel has an internal diameter DH in the range of 10 µm to 60 µm,
- the light beam has an angle of incidence of less than 2 degrees in relation to the hollow channel's longitudinal axis on entering the hollow channel, and
- the light beam has a radial light intensity distribution with a minimum beam diameter DL, wherein the following applies to the diameter ratio DL/DH: 0.05<DL/DH<2.00.

In the analytical apparatus according to one embodiment, the measuring cell is configured as a glass capillary, the inner bore of which forms the hollow channel for receiving or passing through the test sample to be analyzed. The test sample is confined in the hollow channel or is passed through the hollow channel in a continuous flow.

In the simplest case, the glass capillary is configured as a hollow cylinder made of optically uniform glass material, so that the capillary wall has a homogeneous refractive index profile in the radial direction. In contrast to the known measuring cell, the hollow channel does not therefore have light guidance that is based on total internal reflection and that contributes to the illumination of the hollow channel in the form of an optical waveguide structure. Such a waveguide structure of a hollow-cylinder wall could allow light guidance that would, in theory, be dissipation-free laterally to the hollow-cylinder axis and would thus allow a homogeneous illumination over a long distance in the inner bore formed by the hollow cylinder's internal wall. A capillary with a uniform refractive index profile—as here—does not generally, however, guide any light in the inner volume of the hollow channel formed by the capillary wall. In order to achieve a measurement with a high signal-to-noise ratio and high measuring sensitivity nevertheless, an efficient coupling of the light beam into the hollow channel is desirable together with transmission losses that are sufficiently low for the application.

It is therefore provided in the apparatus presented here, by the selection and adjustment of design measures for beam guidance, to introduce light into the hollow channel in such a way that defined intensity profiles form in the plane normal to the hollow channel's longitudinal axis, so-called modes, which are guided along the hollow channel's longitudinal axis but are physically intrinsically subject to an energy loss as a result of a lateral dissipation of energy. To minimize this energy loss it has to be ensured that the coupling of the light into the capillary's hollow channel is performed such that a large portion of the power, in particular the greatest portion of the power, is guided in the so-called fundamental mode. The intensity distribution of the fundamental mode contributes on the one hand to a particularly homogeneous illumination of the hollow-channel volume compared to all other possible modes, so that a particularly fault-free measurement of the particles to be analyzed is made possible. On the other hand, this ensures that the light is guided along the capillary's longitudinal axis and in particular along a predefined measuring distance with the lowest possible loss. The reason for this is that the losses due to energy dissipation transverse to the hollow channel's longitudinal axis are lower for the fundamental mode than for all other modes.

Furthermore, the injection of the optical power into the fundamental mode reduces the undesirable effect of so-called "mode mixing". In this case, a distribution of the light energy from one mode to another mode occurs along an optical waveguide. This leads to an intensity profile that varies along the optical waveguide's longitudinal axis within its normal plane, wherein a multitude of factors make it difficult to determine the intensity profile precisely. However, it is helpful to know this intensity profile in order to qualify the particles to be analyzed.

The design measures mentioned above are explained in more detail below:

(1) The comparatively weak light guidance in the hollow channel of the capillary leads to high optical attenuation of the coupled-in light beam. It has been shown that the attenuation depends on the capillary's internal diameter and is higher the smaller the internal diameter.

The hollow channel therefore has an internal diameter DH in the range of 10 µm to 60 µm. With a hollow-channel internal diameter of less than 10 µm, high optical attenuation occurs, which makes it difficult to perform a reliable, reproducible measurement with a high signal-to-noise ratio. In one embodiment, therefore, the hollow channel's internal diameter is at least 20 µm. The hollow channel contains the sample particles to be analyzed, which can move freely in the available hollow-channel volume. The mobility in the lateral direction (perpendicular to the hollow channel's longitudinal axis) is limited by the hollow channel's internal diameter. With a hollow-channel internal diameter of more than 60 µm, the volume and in particular the particle mobility in the lateral direction are so great that a reliable detection by the detector is made difficult owing to limited depth of field.

The light beam generated by the light source enters the hollow channel at an end-face input point (=end-face aperture of the hollow channel), and as it propagates further through the hollow channel it is scattered from the sample particles contained therein, emitting scattered light, and is thus attenuated. The scattered light is detected by the detector. The scattered light detection can start directly at the input point, although additional reflections and parasitic scattering effects occur there, making a precise detection and evaluation of the particle scattering more difficult. The start of the scattered light detection is therefore in one embodiment downstream of the input point, viewed in the direction of irradiation, e.g. over a length of at least 2 mm.

"Scattered light" here is understood to mean the illumination light exiting the hollow channel through the capillary wall and being detected by the detector. The wall is transparent to the illuminating light.

(2) For transmitting the light beam from the light source to the input point, an optical transmission device is provided. This includes e.g. an optical fiber or an arrangement of optical components for transmitting a free beam. The coupling of the light beam into the hollow channel is essentially determined by the numerical aperture (referred to below as "NA") of the optical transmission device and the diameter ratio of minimum beam diameter and hollow-channel internal diameter. In the apparatus according to one embodiment an optical transmission device with a comparatively small NA is used. This is shown by the fact that the light beam has a radial light intensity distribution with a minimum beam diameter DL, which is approximately as large as the internal diameter DH of the hollow channel; more precisely, the following relation applies to the diameter ratio DL/DH: $0.05 < DL/DH < 2.00$, in one embodiment: $0.1 < DL/DH < 1.00$ and in one embodiment: $0.2 < DL/DH < 0.5$.

The minimum beam diameter DL is determined in the case of a free beam from the waist width in the beam focus and in the case of a fiber feed from the core diameter at the light output end of the optical fiber.

The distance between the plane with minimum beam diameter DL and the end-face aperture of the hollow channel is as small as possible; it is in one embodiment less than 10 mm and ideally zero.

(3) The measure explained in (2) above can, in principle, be achieved by sufficiently strong focusing of the light beam. However, strong focusing is associated with high divergence of the light beam. It has been shown, however, that a small divergence angle is needed and accordingly a low focusing of the light beam is desirable. If the light beam impinges on the end-face aperture of the hollow channel at a flat angle, as a function of the angle of incidence part of the light is reflected at the hollow channel's internal wall and another part will penetrate into the capillary wall and leave the capillary as loss light with a high degree of energy loss. To favor a high proportion of reflected light and the lowest possible loss light in association with the greatest possible detection length, the light beam has an angle of incidence of less than 2 degrees, and in one embodiment less than 1 degree, in relation to the hollow channel's longitudinal axis on entering the hollow channel. The angle of incidence is defined here as the hollow-channel-side acceptance angle (corresponding to half the aperture angle).

The requirements regarding a comparatively small beam diameter on the one hand and a small divergence angle on the other hand are to a certain extent contradictory. However, the combination of these measures in the apparatus according to the embodiment results in the beam guidance explained above, in which a high proportion of the coupled-in luminous power is transferred to the fundamental mode.

In this connection, an embodiment of the apparatus is preferred in one embodiment in which the glass capillary consists of quartz glass.

Quartz glass is largely transparent over a broad wavelength range between about 150 nm and 3000 nm. Thus, the glass capillary permits an illuminating radiation with wavelengths ranging from UV to infrared, with a small scattering contribution by the capillary wall. Moreover, quartz glass material makes it easy, even with hollow channels having a small aperture cross-section, to achieve particularly smooth internal walls owing to a relatively large temperature range in which the capillary can be drawn by hot forming. The quartz glass of the capillary can be undoped. It can also contain one or more dopants.

The refractive index of the glass $\Delta nK$ of the capillary is in one embodiment matched to the refractive index $\Delta nM$ of the sample to be taken up according to a specification or other provision of use. $\Delta nK$ is in one embodiment greater, and in one embodiment at least 0.1 greater, than $\Delta nM$ (measured in each case at the measuring wavelength of 532 nm and the measuring temperature of 20° C.). The test sample is generally taken up in an aqueous medium. For the refractive index of water compared with air, values of around 1.33 are given in the literature (measuring parameters as stated above). The refractive index of quartz glass is about 1.45 and so, in principle, a capillary made of quartz glass satisfies the aforementioned dimensioning rule $\Delta nM < \Delta nK - 0.1$.

In terms of low transmission losses in the hollow channel it has proved useful if, as far as possible, the glass capillary is not bent but, on the contrary, is straight along its entire length, in particular at least along the signal-detecting length. "Straight" here is intended to mean a profile in which the positions of the capillary's longitudinal axis at the start and at the end of the signal-detecting length are at a distance of less than 1 mm from each other in a projection perpendicular to the irradiation direction. The signal-detecting length corresponds to the section of the length of the capillary along which scattered light detection is intended; this section of length measures at least 2 mm and no more than 20 cm, measured from the input point.

The undesirable effect of "mode mixing" is also intensified by bends in the capillary and locally acting mechanical tensile or compressive stresses. By establishing a high bending stiffness and/or a sufficiently high area moment of inertia, in particular caused by a high thickness of the capillary wall, mechanical stresses can be absorbed and bends suppressed.

On the other hand, the hollow-channel wall can contain scattering centers and it contributes to the optical attenuation of the scattered light to be detected by the detector.

It has therefore proved useful if the glass capillary has a hollow-channel wall with a wall thickness of at least 100 µm, at least 500 µm and in one embodiment at least 1000 µm, and a wall thickness of no more than 10 mm, no more than 5 mm and in one embodiment no more than 2 mm, wherein the hollow-channel wall has a homogeneous refractive index profile viewed in the radial direction.

In one embodiment, the optical device is configured as an optical fiber in the form of a multi-mode or single-mode optical fiber with a fiber core and a cladding surrounding the fiber core, and wherein the optical fiber has a numerical aperture NA to which the following applies: NA<0.05.

The atypically low NA of the optical fiber enables the flattest possible angle of incidence to be achieved, thus contributing to improving the coupling efficiency and guidance of the light beam in the capillary's hollow channel.

The light modes guided in a multi-mode optical fiber have different refractive indices in the test sample and are attenuated differently. For the single mode of the mono-mode optical fiber, the parameters for the coupling can be optimized so that a comparatively higher coupling efficiency is obtained, particularly into the fundamental mode of the capillary.

Notwithstanding the above, it proves expedient particularly in terms of a high coupling efficiency if the optical fiber has a mode field diameter DM which is in the following relationship relative to the internal diameter DH of the hollow channel: $0.05 < DM/DH < 2.00$, in one embodiment: $0.1 < DM/DH < 1.00$ and in one embodiment: $0.2 < DM/DH < 0.5$.

The mode field diameter is a parameter for characterizing the light distribution of the fundamental mode in the single-mode fiber. For a radial light intensity distribution that can be approximated by a Gaussian curve, the mode field diameter is that in which the amplitude of the light intensity has fallen to $1/e$ (about 37%).

The detector is in one embodiment configured such that it detects the scattered light along a signal-detecting length having a length of at least 2 mm and no more than 20 cm from the input point.

For detection lengths of more than 20 cm, homogeneous illumination of the sample volume is made more difficult by the attenuation of the light beam along the detection length.

In terms of a higher measuring accuracy, it proves favorable if the hollow channel has an internal cross-section with at least one flattened portion and/or that the capillary has an external cross-section with at least one flattened portion.

With a round internal cross-section and a round external cross-section the measuring window through which the detector detects the scattered light is curved. The curvature leads to distortions of the image and undesirable deflections of the scattered light and/or to optical errors in the image and has to be taken into account in the analysis. The analysis is facilitated if at least the internal or at least the external measuring-window boundary surface is flat, and particularly so if both measuring-window boundary surfaces are flat. This is achieved by a flattened portion on one or both sides of the capillary wall. The flattened portion on one or both sides can also be achieved by a polygonal internal and/or external cross-section.

In one embodiment of the apparatus, the hollow channel is formed in a plate-like body with mutually opposing flat sides, wherein the flat sides of the body form outer walls of the capillary.

The plate-like body has e.g. a rectangular shape, in particular the shape of a microscope slide, and it is in one embodiment distinguished by high bending stiffness. The plate-like body forms the capillary or the capillary is integrated in the plate-like body. It can run e.g. in a longitudinal direction within the rectangular shape.

Capillaries are generally produced by elongating a hollow cylinder. During this operation, drawing marks and other surface structures can form on both the hollow channel's internal wall and the capillary's external wall, representing interference in the measuring path of the scattered light measurement and negatively affecting the measurement result through reflection and scattering. In order to avoid, as far as possible, falsifications due to parasitic scattering effects and interfaces, it is desirable for the hollow channel's internal wall to be as smooth as possible, with a surface roughness defined by an average roughness depth Ra of less than 1 nm.

Advantageously, the capillary's external wall also has a surface roughness defined by an average roughness depth Ra of less than 1 nm.

The roughness depth is measured by atomic force microscopy (AFM). The average roughness depth is determined from the measured values in accordance with DIN 4768 (2010).

With regard to the method for analyzing particles, the above-mentioned technical problem is solved according to one embodiment by a method comprising the following method steps:

a measuring cell is used in which the hollow channel has an internal diameter DH in the range of 10 µm to 60 µm,
  the light beam has a radial light intensity distribution with a minimum beam diameter DL, wherein the following applies to the diameter ratio DL/DH:
  0.05<DL/DH<2.00, and
  the light beam has an angle of incidence of less than 2 degrees in relation to the hollow channel's longitudinal axis on entering the hollow channel.

In the analytical method according to one embodiment, the measuring cell is configured as a glass capillary, the inner bore of which forms the hollow channel for receiving or passing through the sample to be analyzed. The test sample is confined in the hollow channel or is passed through the hollow channel in a continuous flow.

In the simplest case, the glass capillary is configured as a hollow cylinder made of optically uniform glass material, so that the capillary wall has a homogeneous refractive index profile in the radial direction. In contrast to the known measuring cell, the hollow channel does not therefore have light guidance that is based on total internal reflection and that contributes to the illumination of the hollow channel in the form of an optical waveguide structure. Such a waveguide structure of a hollow-cylinder wall could allow light guidance that would, in theory, be dissipation-free laterally to the hollow-cylinder axis and would thus allow a homogeneous illumination in the inner bore formed by the hollow cylinder's internal wall over a long distance. A capillary with a uniform refractive index profile—as here—does not generally, however, guide any light in the inner volume of the hollow channel formed by the capillary wall. In order to achieve a measurement with a high signal-to-noise ratio and high measuring sensitivity nevertheless, an efficient coupling of the light beam into the hollow channel is desirable together with transmission losses that are sufficiently low for the application.

It is therefore provided in the method according to one embodiment, by the selection and adjustment of design measures for beam guidance, to introduce light into the hollow channel in such a way that defined intensity profiles form in the plane normal to the hollow channel's longitudinal axis, so-called modes, which are guided along the hollow channel's longitudinal axis but are physically intrinsically subject to an energy loss as a result of a lateral dissipation of energy. To minimize this energy loss it has to be ensured that the coupling of the light into the capillary's hollow channel is performed such that a large portion of the power, in particular the greatest portion of the power, is guided in the so-called fundamental mode. The intensity distribution of the fundamental mode contributes on the one hand to a particularly homogeneous illumination of the hollow-channel volume compared to all other possible modes, so that a particularly fault-free measurement of the particles to be analyzed is made possible. On the other hand, this ensures that the light is guided along the capillary's longitudinal axis and in particular along a predefined measuring distance with the lowest possible loss. The reason for this is that the losses due to energy dissipation transverse to the hollow channel's longitudinal axis are lower for the fundamental mode than for all other modes.

Furthermore, the injection of the optical power into the fundamental mode reduces the undesirable effect of so-called "mode mixing". In this case, a distribution of the light energy from one mode to another mode occurs along an optical waveguide. This leads to an intensity profile that varies along the optical waveguide's longitudinal axis within its normal plane, wherein a multitude of factors make it difficult to determine the intensity profile precisely. However, it is helpful to know this intensity profile in order to qualify the particles to be analyzed.

The design measures mentioned above are explained in more detail below:

(1) The comparatively weak light guidance in the hollow channel of the capillary leads to high optical attenuation of the coupled-in light beam. It has been shown that the attenuation depends on the capillary's internal diameter and is higher the smaller the internal diameter.

The hollow channel therefore has an internal diameter DH in the range of 10 µm to 60 µm. With a hollow-channel internal diameter of less than 10 µm, high optical attenuation occurs, which makes it difficult to perform a reliable, reproducible measurement with a high signal-to-noise ratio. In one embodiment, therefore, the hollow channel internal diameter is at least 20 µm.

The hollow channel contains the sample particles to be analyzed, which can move freely in the available hollow-channel volume. The mobility in the lateral direction (perpendicular to the hollow channel's longitudinal axis) is limited by the hollow channel's internal diameter. With a hollow-channel internal diameter of more than 60 µm, the volume and in particular the particle mobility in the lateral direction are so great that a reliable detection by the detector is made difficult owing to limited depth of field.

The light beam generated by the light source enters the hollow channel at an end-face input point (=end-face aperture of the hollow channel), and as it propagates further through the hollow channel it is scattered from the sample particles contained therein, emitting scattered light, and is thus attenuated. The scattered light is detected by the detector. The scattered light detection can start directly at the input point, although additional reflections and parasitic scattering effects occur there, making a precise detection and evaluation of the particle scattering more difficult. The start of the scattered light detection is therefore in one embodiment downstream of the input point, viewed in the direction of irradiation, e.g. over a length of at least 2 mm.

"Scattered light" here is understood to mean the illumination light exiting the hollow channel through the capillary wall and being detected by the detector. The wall is transparent to the illuminating light.

(2) For transmitting the light beam from the light source to the input point, an optical transmission device is provided. This includes e.g. an optical fiber or an arrangement of optical components for transmitting a free beam. The coupling of the light beam into the hollow channel is essentially determined by the numerical aperture (referred to below as "NA") of the optical transmission device and the diameter ratio of minimum beam diameter and hollow-channel internal diameter. In the method according to one embodiment an optical transmission device with a comparatively small NA is used. This is shown by the fact that the light beam has a radial light intensity distribution with a minimum beam diameter DL, which is approximately as large as the internal diameter DH of the hollow channel; more precisely, the following relation applies to the diameter ratio DL/DH: 0.05<DL/DH<2.00, in one embodiment: 0.1<DL/DH<1.00 and in one embodiment: 0.2<DL/DH<0.5.

The minimum beam diameter DL is determined in the case of a free beam from the waist width in the beam focus and in the case of a fiber feed from the core diameter at the light output end of the optical fiber.

The distance between the plane with minimum beam diameter DL and the end-face aperture of the hollow channel is as small as possible; it is in one embodiment less than 10 mm and ideally zero.

(3) The measure explained in (2) above can, in principle, be achieved by sufficiently strong focusing of the light beam. However, strong focusing is associated with high divergence of the light beam. It has been shown, however, that a small divergence angle is needed and accordingly a low focusing of the light beam is desirable. If the light beam impinges on the end-face aperture of the hollow channel at a flat angle, as a function of the angle of incidence part of the light is reflected at the hollow channel's internal wall and another part will penetrate into the capillary wall and leave the capillary as loss light with a high degree of energy loss. To favor a high proportion of reflected light and the lowest possible loss light in association with the greatest possible detection length, the light beam has an angle of incidence of less than 2 degrees, and in one embodiment less than 1 degree, in relation to the hollow channel's longitudinal axis on entering the hollow channel. The angle of incidence is defined here as the hollow-channel-side acceptance angle (corresponding to half the aperture angle).

The requirements regarding a comparatively small beam diameter on the one hand and a small divergence angle on the other hand are to a certain extent contradictory. However, the combination of these measures in the method according to one embodiment results in the beam guidance explained above, in which a high proportion of the coupled-in luminous power is transferred to the fundamental mode.

Advantageous embodiments of the method according to one embodiment can be taken from the dependent claims. Where embodiments of the method given in the dependent claims are based on the embodiments mentioned in claims relating to the apparatus according to one embodiment, reference should be made to the above statements regarding the corresponding apparatus claims for supplementary explanation. Other specific embodiments of the method will be explained in more detail below.

For example, a method variant has proved particularly favorable in which the test sample has a refractive index $\Delta nM$ and the glass of the capillary has a refractive index $\Delta nK$, wherein the following applies: $\Delta nM<\Delta nK$, in one embodiment $\Delta nM<\Delta nK-0.1$.

The refractive index of the glass $\Delta nK$ of the capillary is matched to the refractive index $\Delta nM$ of the sample to be received. In particular, $\Delta nK$ is in one embodiment greater, and in one embodiment at least 0.1 greater, than $\Delta nM$ (measuring wavelength: 532 nm; measuring temperature of 20° C.). The test sample is generally taken up in an aqueous medium. For the refractive index of water compared with air, values of around 1.33 are given in the literature (measuring parameters as stated above). The refractive index of quartz glass is about 1.45 and so, in principle, a capillary made of quartz glass satisfies the aforementioned dimensioning rule $\Delta nM<\Delta nK-0.1$.

The analytical apparatus according to one embodiment and the analytical method according to one embodiment can be employed to perform analyses of particles in the medical and non-medical field, in particular in flow cytometry. Here, liquids are passed through a cuvette and the molecules or colloidal substances contained therein are analyzed with respect to e.g. their size, mass or structure. In optical analysis, a light beam is focused on the liquid flow so that individual molecules can be analyzed. With the aid of this method, high numbers of measurements per unit of time can be achieved (more than 1000 measurement events per second) and thus statistically sound conclusions about the sample can be achieved rapidly.

FIG. 1 shows a basic measurement setup for flow cytometry using the apparatus according to one embodiment.

The measuring principle is based on the optical detection of scattered or fluorescent light or light otherwise emitted as a consequence of the illumination of a sample particle. The detection here can, but does not necessarily have to, take place for selected locations, selected frequencies or selected intensities. With the aid of appropriate analytical optics and algorithms, properties of the sample particles being investigated, such as size, shape, rates of diffusion, mobilities or scattering cross-sections, can thus be recorded.

In the measurement setup of FIG. 1, a flow-measuring cell according to one embodiment in the form of a quartz glass capillary 1 with a wall 3 and a hollow channel 4 is used. Through the hollow channel 4 a liquid flow is passed, containing the sample particles 5 to be characterized. The liquid flow is illuminated using a light source 2 in the form of a frequency-doubled Nd:YAG laser. The laser light with a wavelength of 532 nm is guided by way of an optical fiber 6 to the quartz glass capillary 1 and enters the hollow channel 4 as a light beam 63 at the end-face input point 10.

The optical fiber 6 is configured as a single-mode fiber. It has a core 61 and a cladding 62 surrounding the core, wherein the refractive index of the core 61 is higher than the refractive index of the cladding 62 so that the laser light is substantially guided in the core 61 by total internal reflection.

The core 61 has a diameter of 10 µm and the mode field diameter is 7 µm.

As an alternative to monochrome laser light, a polychrome exciting radiation is used.

As an alternative to the single-mode fiber, a multi-mode fiber is used. This also has a core and a cladding surrounding the core, wherein the refractive index of the core is higher than the refractive index of the cladding so that the laser light is substantially guided in the core 61 by total internal reflection.

The core here has a diameter of 10 µm, wherein the refractive index step between cladding and core is higher compared to the configuration as mono-mode fibers.

The capillary 1 is coupled to a conventional microscope setup 7, which includes a camera 8, the focus or detection level of which is in the region of the hollow channel's central axis 9 and by means of which the test sample and the sample particles 5 contained therein are observed and passed on for data analysis. This involves detection of the elastic light scattering (Rayleigh scattering) which is emitted by the sample particles as scattered light at the same frequency as the excitation frequency. Owing to the low attenuation of the capillary 1, hardly any background scattering occurs in the fiber material itself. The detection length within which the camera 8 can detect the scattered light is between 2 mm and 20 cm. Over this length the capillary 1 runs completely straight. In other words, the positions of the capillary's longitudinal axis 9 at the start and at the end of this length in the projection perpendicular to the direction of irradiation are at a distance of less than 1 mm from each other.

By means of the sCMOS camera 8 which acts as a detector, the coherent scattering intensity of the scattered light, the incoherent scattering intensity of the scattered light, the spectral distribution of the scattered light, the spatial distribution of the scattered light and/or the dynamic motion of the particles 5 to be measured can be detected. In addition, the camera is also configured to detect scattered fluorescent light that is generated by the illumination of the particles to be measured.

Figure 2:
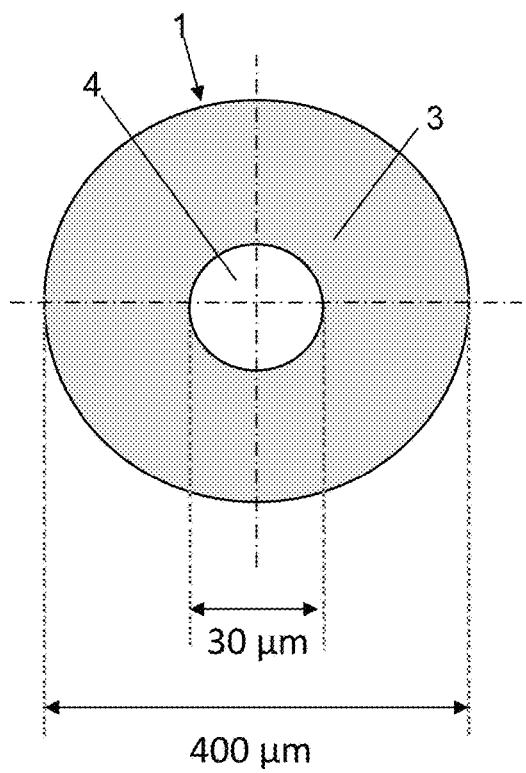
FIG. 2: illustrates the glass capillary with a hollow channel in a top view of an end face in a schematic illustration.

FIG. 2 shows a schematic top view of the end face of the measuring cell in the form of the quartz glass capillary 1 with the wall 3 and the hollow channel 4. The capillary wall 3 consists of synthetically produced, undoped quartz glass with a refractive index of 1.4607. This value is based on a measurement with a light wavelength of 532 nm and a measuring temperature of 20° C. These measuring conditions are also used for the refractive index values given below unless explicitly stated otherwise.

The capillary 1 has an external diameter of 400 μm. The hollow channel 4 has a diameter of 30 μm. The hollow channel 4 runs coaxially with the capillary's central axis 9 (see FIG. 1) and with the main direction of propagation of the laser light beam 63. The cladding 3 has no interfaces or other structural discontinuities or inhomogeneities that would lead to any significant scattering.

The capillary 1 is made by elongating a hollow cylinder composed of the synthetically produced, undoped quartz glass. The surface roughness characterized by the average roughness depth $R_a$ is less than 1 nm.

Figure 3:
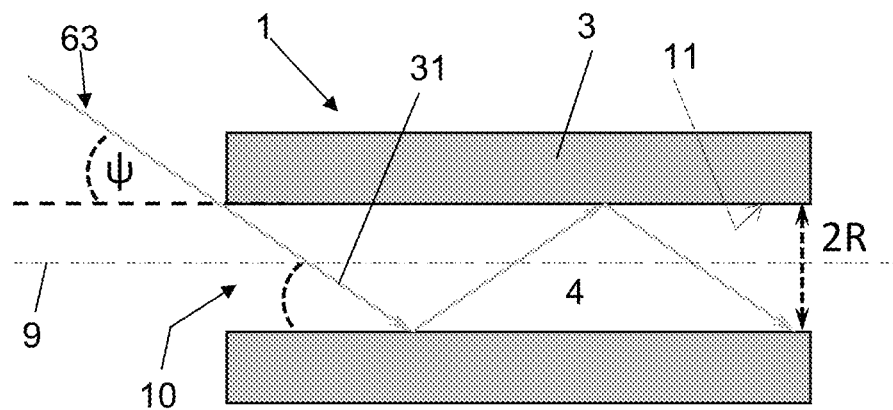
FIG. 3: is a sketch to explain the coupling of a light beam into the hollow channel of the capillary.

The sketch of FIG. 3 serves to illustrate the coupling of the laser light beam 63 at the input point 10 into the hollow channel 4 filled with the test sample. The light beam 63 has an angle of incidence of less than 1 degree in relation to the hollow channel's longitudinal axis 9 on entering the hollow channel 4. The angle of incidence φ (phi) is obtained by solving the beam equation for the fundamental mode 31. It corresponds to the hollow-channel-side acceptance angle for the fundamental mode 31 (which corresponds to half the aperture angle) and at the same time to the angle at which the fundamental mode is guided in the hollow channel 4 using an optical beam model approach.

Figure 4:
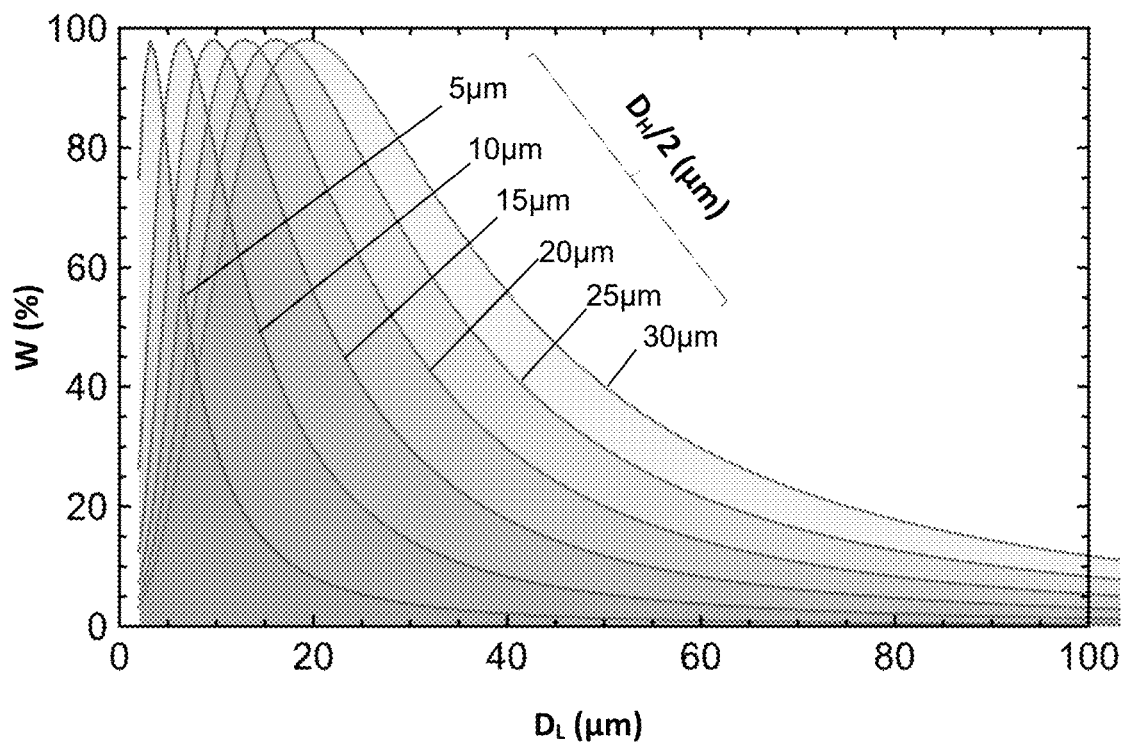
FIG. 4: is a diagram to explain the coupling efficiency in relation to the hollow-channel inner radius and the beam diameter.

In the diagram of FIG. 4 the coupling efficiency W (in %) for light beams 63 with a wavelength of 532 nm is plotted for different radii $D_H/2$ (in μm) as a function of the minimum beam diameter $D_L$ (in μm) for the case in which the hollow channel 4 is filled with water and the illumination takes place in the form of a Gaussian light beam which is focused on the end-face aperture (input point 10) of the capillary. The refractive index of water is 1.33, and so a refractive index step of 0.1307 to the hollow-channel wall is obtained.

According to this, the coupling efficiency for each hollow-channel radius has a marked maximum at a specific beam diameter. As the hollow-channel radius increases, the maximum expands and at the same time shifts towards greater beam diameters.

According to this, an optimum beam diameter of about a third of the hollow channel's internal diameter is obtained for hollow-channel radii of up to about 30 μm. For the diameter ratio $D_L/D_H$ the optimum is in the range of 0.3, with a limit value of at least 20% coupling efficiency being used.

This shows that the optimum coupling is not achieved by bringing the beam waist of the light beam 63 to the diameter of the capillary's inner wall but the relationship follows a complex path which is dependent on the capillary diameter.

Figure 5:
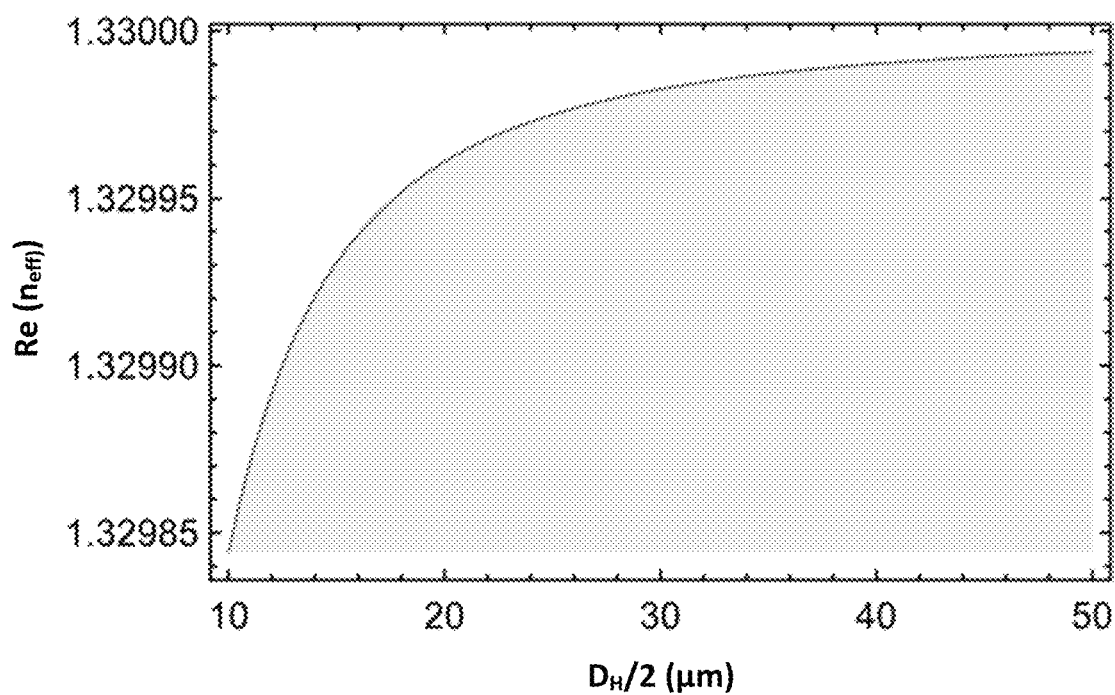
FIG. 5: is a diagram to explain the dependency of the effective refractive index on the radius of the hollow channel.

In the diagram of FIG. 5, in the case of a water-filled hollow channel 4 the effective refractive index Re ($n_{eff}$) for a light beam with a wavelength of 532 nm is plotted against the hollow-channel radius $D_H/2$ (in μm).

Figure 6:
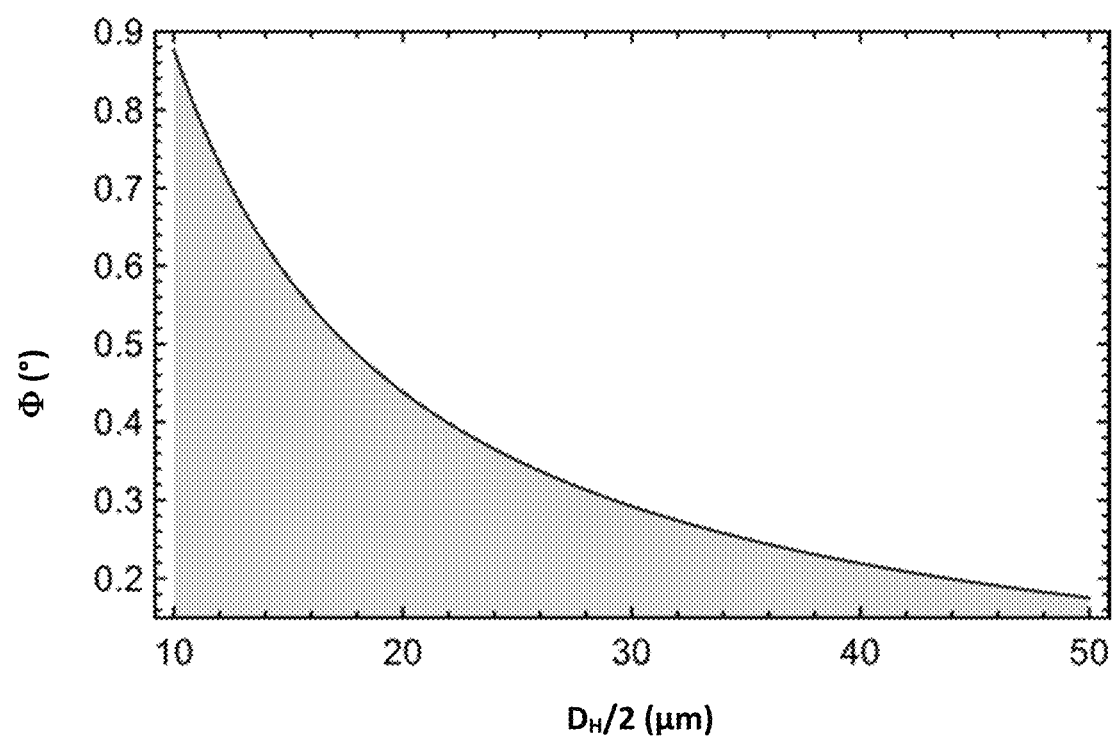
FIG. 6: is a diagram to explain the dependency of the angle of reflection of the fundamental mode of the capillary on the radius of the hollow channel.

This value describes a parameter for the shape and type of propagation of the fundamental mode of the capillary and is calculated from a complete solution of the underlying dispersion equation. This allows a calculation of the curves of the illustrative variables of numerical aperture and divergence angle of the same mode as shown in the following FIGS. 6 and 7. In the diagram of FIG. 6 the angle of reflection φ (in degrees) of the fundamental mode for a water-filled hollow channel 4 is plotted against the hollow-channel radius $D_H/2$ (in μm).

The angle is obtained here from solving the underlying equations, which give $n_{eff}$ and can be converted to this angle. In an optical beam model, the angle can be interpreted here as the angle at which a guided beam of the fundamental mode is reflected within the channel by a wall and, at the same time, as the exit angle of this beam from the capillary after passing through completely. For coupling in with maximum efficiency, the incident light should also be guided to the capillary at precisely this angle.

It can be seen here that, with increasing channel diameter, the angle of reflection decreases constantly. This means that coupling into a capillary with increasing capillary diameter requires an increasingly flat angle of incidence for coupling into the fundamental mode with constant efficiency.

Figure 7:
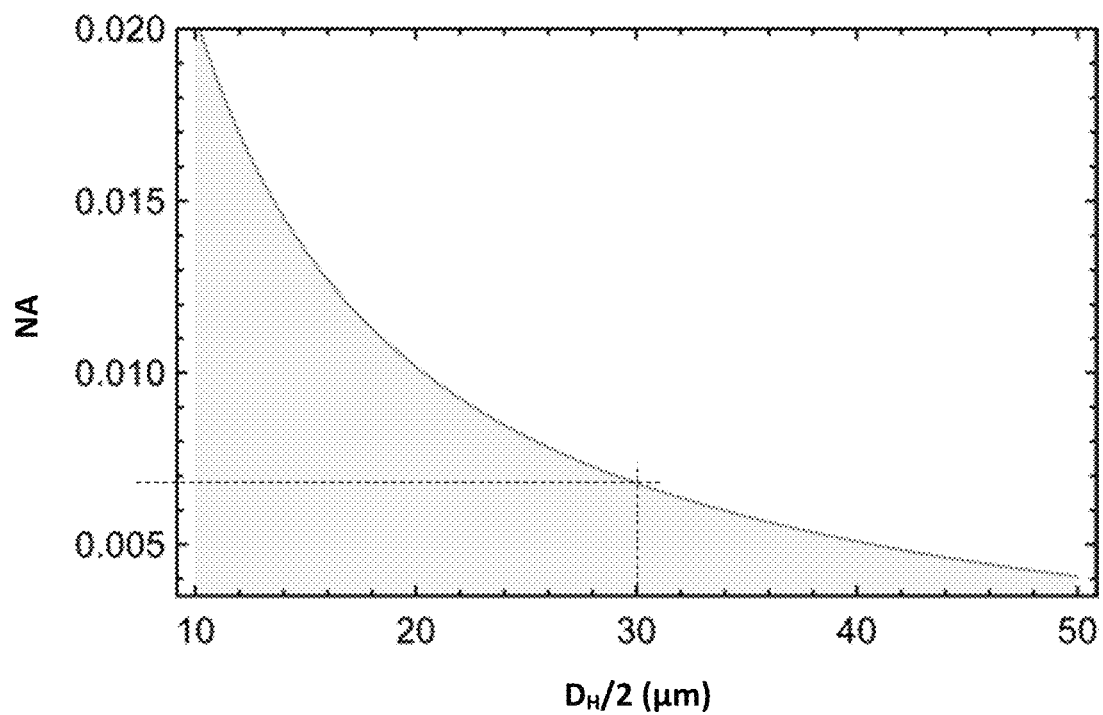
FIG. 7: is a diagram to explain the dependency of the numerical aperture (NA) on the radius of the hollow channel.

In the diagram of FIG. 7, for a water-filled hollow channel 4 the numerical aperture NA of the fundamental mode is plotted against the hollow-channel radius $D_H/2$ (in μm). According to this, the optimum NA decreases with an increasing hollow-channel radius and reaches a value of 0.007 at a hollow-channel radius of 30 μm. As in the case of the curve for the angle of reflection it can be seen from the figure that the NA of the light to be coupled in has to be increasingly small as the capillary diameter increases for coupling into the fundamental mode with equal efficiency.

Figure 8:
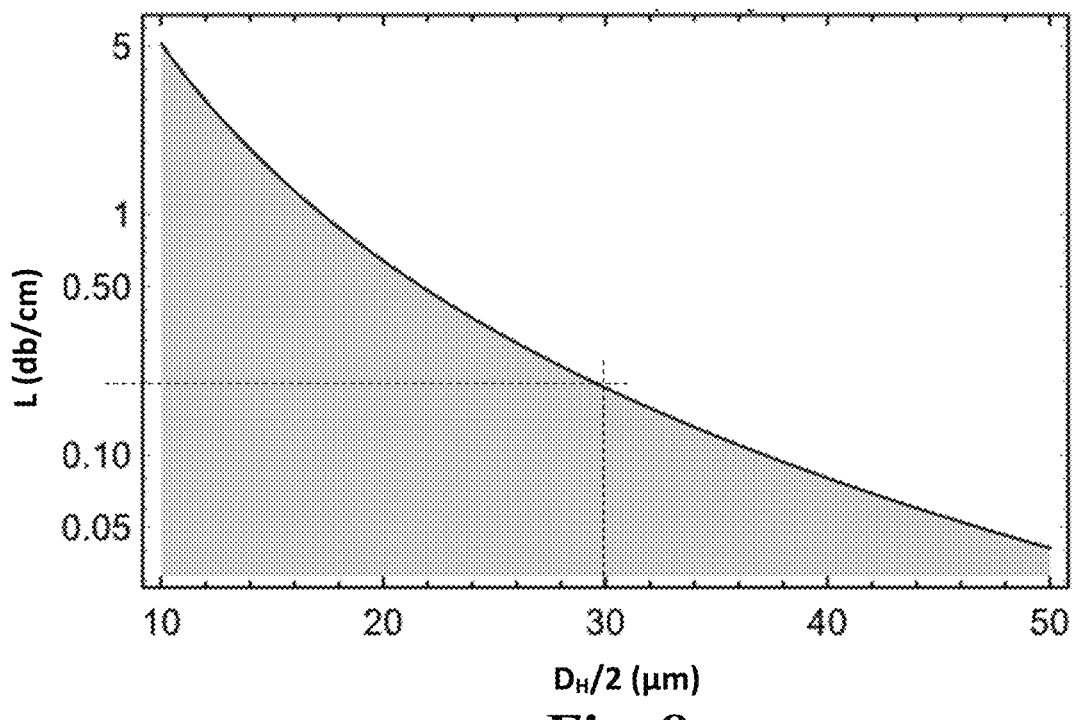
FIG. 8: is a diagram to explain the optical attenuation of the light beam on the radius of the hollow channel.

In the diagram of FIG. 8, for the case of a water-filled hollow channel 4 the optical attenuation L (in dB/cm) of the light intensity guided in the hollow channel 4 within the fundamental mode is plotted against the hollow-channel radius $D_H/2$ (in μm). According to this, the attenuation increases rapidly as the hollow channel becomes narrower. For a hollow-channel radius of 30 μm the light beam is subject to a theoretical attenuation of about 0.2 dB/cm, and for a hollow-channel radius of 10 μm the light beam is subject to a theoretical attenuation of about 5 dB/cm.

To perform a measurement, the particles 5 to be investigated are taken up in an aqueous medium and introduced as drops of liquid into one end of the capillary. Through the suction effect of the capillary force, the liquid together with the contained particles is drawn into the capillary interior and thus passes through the measuring region imaged by the microscope. The numerical aperture of the optical fiber 6 is configured such that an angle of entry of less than 2 degrees is obtained for the laser beam 2.

The test sample is guided through the hollow channel 4 in a continuous flow, wherein the particles 5 diffuse freely in the aqueous medium within the hollow channel 4 in addition to a directed motion through the filling. At the same time, via the optical fiber 6 a light beam 2 from an Nd:YAG laser is coupled into the aperture 10 of the hollow channel 4, and serves to illuminate the particles 5 in the hollow channel 4. Depending on the polarizability and size of the particles, the illumination generates fluorescence and a coherent and/or incoherent light scattering. Part of the scattered light and fluorescent light exits the hollow channel 4 through the capillary wall 3 and is detected by means of the sCMOS camera 8. The detected scattered light is then processed and evaluated using software.

As a result of the laser beam's small angle of incidence of less than 2 degrees and the diameter ratio $D_L/D_H$ of 0.3, the laser light not scattered by the particles 5 is reflected at the hollow channel's internal wall and guided along the hollow channel 4. As a result of this light guidance and owing to the low surface roughness of the internal wall of the hollow channel 4, low optical attenuation is obtained along a signal-detecting length of up to about 20 cm and this is associated with a signal-to-background and signal-to-noise ratio that can be evaluated, enabling each illuminated particle 5 to be detected within the signal-detecting length.

Instead of the operation with continuous flow of the test sample, the hollow channel 4 also offers the possibility of the one- or two-dimensional containment of the sample volume, as a result of which the sample particles 5 to be investigated can be held in the measuring range over long measuring times.

It is to be understood that the features of the various exemplary embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. An apparatus for analyzing particles, comprising:
a glass capillary as a measuring cell with a hollow channel for receiving or for passing through a test sample containing the particles, said hollow channel having a hollow-channel longitudinal axis and a hollow-channel internal wall;
a light source for generating a light beam and an optical device for coupling the light beam into the hollow channel at an input point for the purpose of illuminating the test sample; and
a detector for detecting scattered light exiting the hollow channel;
wherein the hollow channel has an internal diameter DH in the range of 10 μm to 60 μm;
wherein the light beam has a radial light intensity distribution with a minimum beam diameter $D_L$, wherein the following applies to the diameter ratio $D_L/D_H$: $0.05 < D_L/D_H < 2.00$; and
wherein the light beam has an angle of incidence ($\Psi$) of less than 2 degrees in relation to the hollow channel's longitudinal axis on entering the hollow channel.

2. The apparatus according to claim 1, wherein the glass capillary is straight at least along a signal-detecting length.

3. The apparatus according to claim 1, wherein the glass capillary has a hollow-channel wall with a wall thickness of at least 100 μm, and a wall thickness of no more than 10 mm, and in that the hollow-channel wall viewed in the radial direction has a homogeneous refractive index profile.

4. The apparatus according to claim 1, wherein the glass capillary has a hollow-channel wall with a wall thickness of at least 500 μm and a wall thickness of no more than 5 mm, and in that the hollow-channel wall viewed in the radial direction has a homogeneous refractive index profile.

5. The apparatus according to claim 1, wherein the glass capillary has a hollow-channel wall with a wall thickness of at least 1000 μm, and a wall thickness of no more than 2 mm, and in that the hollow-channel wall viewed in the radial direction has a homogeneous refractive index profile.

6. The apparatus according to claim 1, wherein the glass capillary consists of quartz glass.

7. The apparatus according to claim 1, wherein the optical device is configured as an optical fiber in the form of a multi-mode optical fiber or as a single-mode optical fiber with a fiber core and a cladding surrounding the fiber core, and wherein the optical fiber has a numerical aperture NA to which the following applies: NA<0.05.

8. The apparatus according to claim 7, wherein the capillary is formed in a plate-like body with mutually opposing flat sides, wherein the flat sides of the body form external walls of the capillary.

9. The apparatus according to claim 1, wherein the hollow channel has an internal cross-section with at least one flattened portion and/or in that the capillary has an external cross-section with at least one flattened portion.

10. The apparatus according to claim 1, wherein the detector is configured such that scattered light is detectable along a signal-detecting length of up to 20 cm.

11. The apparatus according to claim 1, wherein the hollow-channel wall has an internal surface with a surface roughness that is defined by an average roughness depth $R_a$ of less than 1 nm.

12. A method for analyzing particles, comprising:
providing a measuring cell in the form of a glass capillary with a hollow channel having a hollow-channel longitudinal axis and a hollow-channel wall;
introducing a test sample containing the particles into the hollow channel, wherein the test sample has a refractive index $\Delta n_M$;
generating a light beam using a light source;
coupling the light beam into the hollow channel by means of an optical input device at an input point for the purpose of illuminating the test sample; and
detecting scattered light exiting the hollow channel using a detector;
wherein a glass capillary is used in which the hollow channel has an internal diameter $D_H$ in the range of 10 μm to 60 μm;
wherein the light beam has a radial light intensity distribution with a minimum beam diameter $D_L$, wherein the following applies to the diameter ratio $D_L/D_H$: $0.05 < D_L/D_H < 2.0$; and
wherein the light beam has an angle of incidence ($\Psi$) of less than 2 degrees in relation to the hollow channel's longitudinal axis on entering the hollow channel.

13. The method according to claim 12, wherein the glass capillary has a hollow-channel wall with a wall thickness of at least 100 μm, and a wall thickness of no more than 10 mm, and in that the hollow-channel wall viewed in the radial direction has a homogeneous refractive index profile.

14. The method according to claim 12, wherein the glass capillary has a hollow-channel wall with a wall thickness of at least 500 μm, and a wall thickness of no more than 5 mm, and in that the hollow-channel wall viewed in the radial direction has a homogeneous refractive index profile.

15. The method according to claim 12, wherein the glass capillary has a hollow-channel wall with a wall thickness of at least 1000 μm, and a wall thickness of no more than 2 mm, and in that the hollow-channel wall viewed in the radial direction has a homogeneous refractive index profile.

16. The method according to claim 12, wherein a glass capillary composed of quartz glass is used.

17. The method according to claim 12, wherein as the optical device an optical fiber in the form of a multi-mode optical fiber or a single-mode optical fiber with a fiber core and a cladding surrounding the fiber core is used, and wherein the optical fiber has a numerical aperture NA to which the following applies: NA<0.05.

18. The method according to claim 12, wherein the test sample has a refractive index $\Delta n_M$ and that the glass of the capillary has a refractive index $\Delta n_K$, wherein the following applies: $\Delta n_M < \Delta n_K$, preferably $\Delta n_M < \Delta n_K - 0.1$.

* * * * *